US012293756B2

(12) United States Patent
Mukherjee et al.

(10) Patent No.: US 12,293,756 B2
(45) Date of Patent: May 6, 2025

(54) COMPUTING SYSTEM FOR DOMAIN EXPRESSIVE TEXT TO SPEECH

(71) Applicant: Microsoft Technology Licensing, LLC, Redmond, WA (US)

(72) Inventors: Arijit Mukherjee, Uttarpara (IN); Shubham Bansal, Yamunanagar (IN); Sandeepkumar Satpal, Hyderabad (IN); Rupeshkumar Rasiklal Mehta, Hyderabad (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/524,288

(22) Filed: Nov. 11, 2021

(65) Prior Publication Data

US 2023/0099732 A1    Mar. 30, 2023

Related U.S. Application Data

(60) Provisional application No. 63/250,981, filed on Sep. 30, 2021.

(51) Int. Cl.
*G10L 13/02* (2013.01)
*G06N 3/088* (2023.01)
(Continued)

(52) U.S. Cl.
CPC ............. *G10L 13/02* (2013.01); *G06N 3/088* (2013.01); *G10L 13/00* (2013.01); *G10L 13/10* (2013.01);
(Continued)

(58) Field of Classification Search
CPC ... G10L 13/02; G10L 13/10; G10L 2013/105; G10L 13/00; G10L 25/30; G10L 25/63; G06N 3/088
See application file for complete search history.

(56) References Cited

U.S. PATENT DOCUMENTS 11,194,972 B1 * 12/2021 Tao ..................... G06N 3/044
11,418,461 B1 *  8/2022 Elfardy ................ G06Q 30/016
(Continued)

OTHER PUBLICATIONS

Wang, Yuxuan, et al. "Style Tokens: Unsupervised Style Modeling, Control and Transfer in End-to-End Speech Synthesis." arXiv preprint arXiv: 1803.09017 (2018), pp. 1-11 (Year: 2018).*
(Continued)

*Primary Examiner* — Jesse S Pullias
*Assistant Examiner* — Michael C. Lee
(74) *Attorney, Agent, or Firm* — CALFEE, HALTER & GRISWOLD LLP

(57) ABSTRACT

A computing system obtains text that includes words and provides the text as input to an emotional classifier model that has been trained based upon emotional classification. The computing system obtains a textual embedding of the computer-readable text as output of the emotional classifier model. The computing system generates a phoneme sequence based upon the words of the text. The computing system, generates, by way of an encoder of a text to speech (TTS) model, a phoneme encoding based upon the phoneme sequence. The computing system provides the textual embedding and the phoneme encoding as input to a decoder of the TTS model. The computing system causes speech that includes the words to be played over a speaker based upon output of the decoder of the TTS model, where the speech reflects an emotion underlying the text due to the textual embedding provided to the encoder.

18 Claims, 5 Drawing Sheets

(51) Int. Cl.
- *G10L 13/00* (2006.01)
- *G10L 13/10* (2013.01)
- *G10L 25/30* (2013.01)
- *G10L 25/63* (2013.01)

(52) U.S. Cl.
CPC .............. *G10L 25/30* (2013.01); *G10L 25/63* (2013.01); *G10L 2013/105* (2013.01)

(56) References Cited

U.S. PATENT DOCUMENTS

| | | | |
|---|---|---|---|
| 11,854,538 B1* | 12/2023 | Rozgic | G10L 25/63 |
| 2013/0018837 A1* | 1/2013 | Lee | A61B 5/165 706/52 |
| 2015/0058019 A1* | 2/2015 | Chen | G10L 13/08 704/260 |
| 2015/0058109 A1 | 2/2015 | Lange | |
| 2018/0174020 A1 | 6/2018 | Wu | |
| 2020/0074981 A1 | 3/2020 | Chae et al. | |
| 2020/0372897 A1 | 11/2020 | Battenberg et al. | |
| 2021/0287657 A1* | 9/2021 | Deng | G06F 40/30 |
| 2021/0350795 A1* | 11/2021 | Kenter | G10L 15/02 |
| 2022/0051654 A1* | 2/2022 | Finkelstein | G06N 3/084 |
| 2022/0129621 A1* | 4/2022 | Guda | G06N 3/08 |
| 2022/0301543 A1* | 9/2022 | Elias | G10L 13/04 |
| 2023/0099732 A1 | 3/2023 | Mukherjee et al. | |
| 2023/0111824 A1 | 4/2023 | Mukherjee et al. | |

OTHER PUBLICATIONS

Wu, Pengfei, et al. "End-to-end emotional speech synthesis using style tokens and semi-supervised training." 2019 Asia-Pacific Signal and Information Processing Association Annual Summit and Conference (APSIPA ASC). IEEE, 2019, pp. 623-627 (Year: 2019).*

Zhu, Xiaolian, et al. "Controlling emotion strength with relative attribute for end-to-end speech synthesis." 2019 IEEE Automatic Speech Recognition and Understanding Workshop (ASRU). IEEE, 2019, pp. 192-199 (Year: 2019).*

Luo, Linkai, et al. "Emotionx-hsu: Adopting pre-trained bert for emotion classification." arXiv preprint arXiv:1907.09669 (2019), pp. 1-4 (Year: 2019).*

Gao, Yang, et al. "Interactive text-to-speech system via joint style analysis." arXiv preprint arXiv:2002.06758v2 (Sep. 21, 2020) (Year: 2020).*

Tits, Noé. "A methodology for controlling the emotional expressiveness in synthetic speech—a deep learning approach." 2019 8th International Conference on Affective Computing and Intelligent Interaction Workshops and Demos (ACIIW) (IEEE) (2019), pp. 6-10 (Year: 2019).*

Schnell, Bastian, et al. "Emocat: Language-agnostic emotional voice conversion." arXiv preprint arXiv:2101.05695 (Jan. 14, 2021), pp. 1-5. (Year: 2021).*

Li, Tao, et al. "Controllable emotion transfer for end-to-end speech synthesis." 2021 12th International Symposium on Chinese Spoken Language Processing (ISCSLP) (IEEE) (Mar. 1, 2021), pp. 1-5. (Year: 2021).*

Lei, Yi, et al. "Fine-grained emotion strength transfer, control and prediction for emotional speech synthesis." 2021 IEEE Spoken Language Technology Workshop (SLT) (IEEE) (Mar. 25, 2021), pp. 423-430. (Year: 2021).*

Cai, Xiong, et al. "Emotion controllable speech synthesis using emotion-unlabeled dataset with the assistance of cross-domain speech emotion recognition." arXiv preprint arXiv:2010.13350 (2020) (Year: 2020).*

Zhu, Xiaolian, et al. "Control Emotion Intensity for LSTM-Based Expressive Speech Synthesis." International Conference of Pioneering Computer Scientists, Engineers and Educators. Singapore: Springer Singapore, 2019. (Year: 2019).*

Um, Se-Yun, et al. "Emotional speech synthesis with rich and granularized control." ICASSP 2020-2020 IEEE International Conference on Acoustics, Speech and Signal Processing (ICASSP). IEEE, 2020, pp. 7254-7258 (Year: 2020).*

Huang, et al., "EmotionX-IDEA: Emotion BERT—an Affectional Model for Conversation", In Repository of arXiv:1908.06264v1, Aug. 17, 2019, 6 Pages.

"Non-Final Office Action Issued in U.S. Appl. No. 17/677,976", Mailed Date: Jul. 13, 2023, 13 Pages.

Final Office Action mailed on May 2, 2024, in U.S. Appl. No. 17/677,976, 12 pages.

Non-Final Office Action mailed on Jan. 28, 2025, in U.S. Appl. No. 17/677,976, 10 Pages.

* cited by examiner

COMPUTING SYSTEM FOR DOMAIN EXPRESSIVE TEXT TO SPEECH

CROSS-REFERENCE TO RELATED APPLICATION

This application claims priority to U.S. Provisional Patent Application No. 63/250,981, filed on Sep. 30, 2021 and entitled "COMPUTING SYSTEM FOR DOMAIN EXPRESSIVE TEXT TO SPEECH", the entirety of which is incorporated herein by reference.

BACKGROUND

A text to speech (TTS) computing system converts computer-readable text into speech that is played over a speaker. TTS computing systems have a wide variety of applications, such as in assistive technologies that aid the visually impaired, video games, and customer service interactions. Recent TTS computing systems have been developed that can generate expressive speech that captures underlying emotion in text. With more particularity, prosody features of the expressive speech match the emotion underlying the text. For instance, from a user perspective, it is desirable for a TTS computing system to deliver "happy" news using speech that is in a "happy" tone as opposed to a "neutral" tone or a "sad" tone. In an example, a conventional TTS computing system is provided with the text "I was on cloud nine when I found out I got my dream job!" and an emotional label that is indicative of a "happy" emotion. The conventional TTS computing system generates speech with prosody features that reflect a "happy" emotion based upon the text and the emotional label. The conventional TTS computing system causes the speech to be played over a speaker.

Conventional TTS computing systems suffer from various deficiencies. First, conventional TTS computing systems require manually labeled data during model training, that is, conventional TTS computing systems require text (e.g., "I am sorry to hear about your loss, I hope you get well soon."), audio data corresponding to the text, and an emotional label (e.g., "sad") in order to train a model that synthesizes expressive speech from text. This is a cumbersome process that adds a large amount of time and complexity to the model training process. Second, conventional TTS computing systems require an emotional label at run-time (provided along with text that is to be converted to speech) in order to generate expressive speech. In an example, a conventional TTS computing system requires a user computing device operated by a user to provide the text and the emotional label to the conventional TTS computing system. This can be cumbersome from a user experience perspective. Third, conventional TTS computing systems require audio data from different speakers from different locales (e.g., British English speakers, American English speakers, etc.) for model training. Collecting and storing such audio data is a cumbersome process and is burdensome on data storage resources. Fourth, conventional TTS computing systems do not enable a user to specify a "level" of emotion that is to be expressed in expressive speech. In an example, a conventional TTS computing system is able to synthesize speech that expresses an "angry" emotion from text upon being provided with the text and an "angry" emotional label, but the conventional TTS computing system cannot control a degree in which the "anger" is expressed in the speech.

SUMMARY

The following is a brief summary of subject matter that is described in greater detail herein. This summary is not intended to be limiting as to the scope of the claims.

Various technologies pertaining to domain expressive text to speech (TTS) are described herein. The technologies described herein synthesize expressive speech from text without requiring emotional labels during TTS model training or at run-time. Furthermore, the technologies described herein also enable a user to specify a "level" of an emotion (e.g., slightly angry, very angry, etc.) that is to be reflected in the expressive speech. Additionally, the technologies described herein enable the synthesis of domain-specific expressive speech from text, where prosody features of the domain-specific expressive speech reflect how a human speaker would utter words in a particular domain (e.g., a newscast, an audiobook, a customer service interaction, etc.)

In example operation, a computing system obtains computer-readable text from an electronic source, where the text includes words. It is contemplated that the words may be associated with an emotion. In an example, the words of the text are "You won the lottery!" and hence the words are associated with a "happy" emotion. The computing system provides the text as input to an emotional classifier model that has been trained based upon emotional classification, that is, the emotional classifier models is trained with words or phrases that have emotional labels assigned thereto, where the emotional labels identify respective emotions assigned to the words or phrases (e.g., happy, sad, angry, etc.). The computing system obtains a textual embedding of the text as output of the emotional classifier model, where the textual embedding includes semantic information about the words of the text. In an example, the computing system obtains the textual embedding from a penultimate layer of the emotional classifier model.

The computing system generates a phoneme sequence based upon the words of the text. The computing system generates a phoneme embedding based upon the phoneme sequence. The computing system generates a phoneme encoding based upon the phoneme sequence. In an example, the computing system provides the phoneme embedding as input to an encoder of a TTS model. The encoder outputs a phoneme encoding based upon the input, where the phoneme encoding reflects acoustic or phonetic information about the text.

The computing system provides the textual embedding and the phoneme encoding as input to the TTS model. In an example, the computing system provides the textual embedding and the phoneme encoding as input to a decoder of the TTS model. In an example, the computing system concatenates the textual embedding and the phoneme encoding to generate a concatenation and provides the concatenation as input to the TTS model. The TTS model outputs a spectrogram (e.g., a mel spectrogram) based upon the textual embedding and the phoneme encoding, where the spectrogram includes features that reflect an emotion underlying the text. In an example where the TTS model includes the encoder, the decoder outputs the spectrogram based upon the textual embedding and the phoneme encoding. The computing system provides the spectrogram to an audio converter which converts the spectrogram into audio data (e.g., a waveform). The computing system provides the audio data to a speaker and the speaker outputs speech that includes the words in the text using the audio data, where the speech expresses the emotion. Prosody features of the speech correspond to the emotion associated with the text (due to the textual embedding described above). Following the example given above, the speech output by the speaker includes the words "You won the lottery!" and is styled in a manner that reflects a "happy" emotion.

According to some embodiments, the computing system receives an identifier for a domain (e.g., newscast) and the computing system provides the identifier for the domain as additional input to the TTS model (e.g., as input to a decoder of the TTS model). Prosody features of the speech correspond to a human speaker speaking in a context of the domain (e.g., a newscaster reading the text) based upon the identifier for the domain being input to the TTS model. According to some embodiments, the computing system receives a value that is indicative of an emotional intensity level. The computing system replaces the textual embedding with a second textual embedding based upon the value, where the second textual embedding corresponds to the emotional intensity level. The second textual embedding may be predefined for the value. The computing system provides the second textual embedding as input to the TTS model (e.g., as input to a decoder of the TTS model) along with the phoneme encoding. Prosody features of the speech reflect the emotional intensity level based upon the second textual embedding and the phoneme encoding.

The above-described technologies present various advantages over conventional TTS computing systems. First, the above-described technologies do not require data that is labeled with emotional labels in order to train a TTS model. This reduces storage requirements and simplifies the training process of the TTS model. Additionally, the above-described technologies reduce time and computational costs associated with labeling. Second, at run-time, the above-described technologies do not require an emotional label to be provided along with text that is to be synthesized into speech, and thus the above-described technologies offer improved user experience. Furthermore, this results in computational advantages, as the technologies described above do not need to process an emotional label at run-time in order to synthesize the speech. Third, the above-described technologies enable a user to specify different "levels" of an emotion as described above. Fourth, the above-described technologies enable expressive speech to be synthesized that includes prosody features that reflect a particular domain.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

Figure 1:
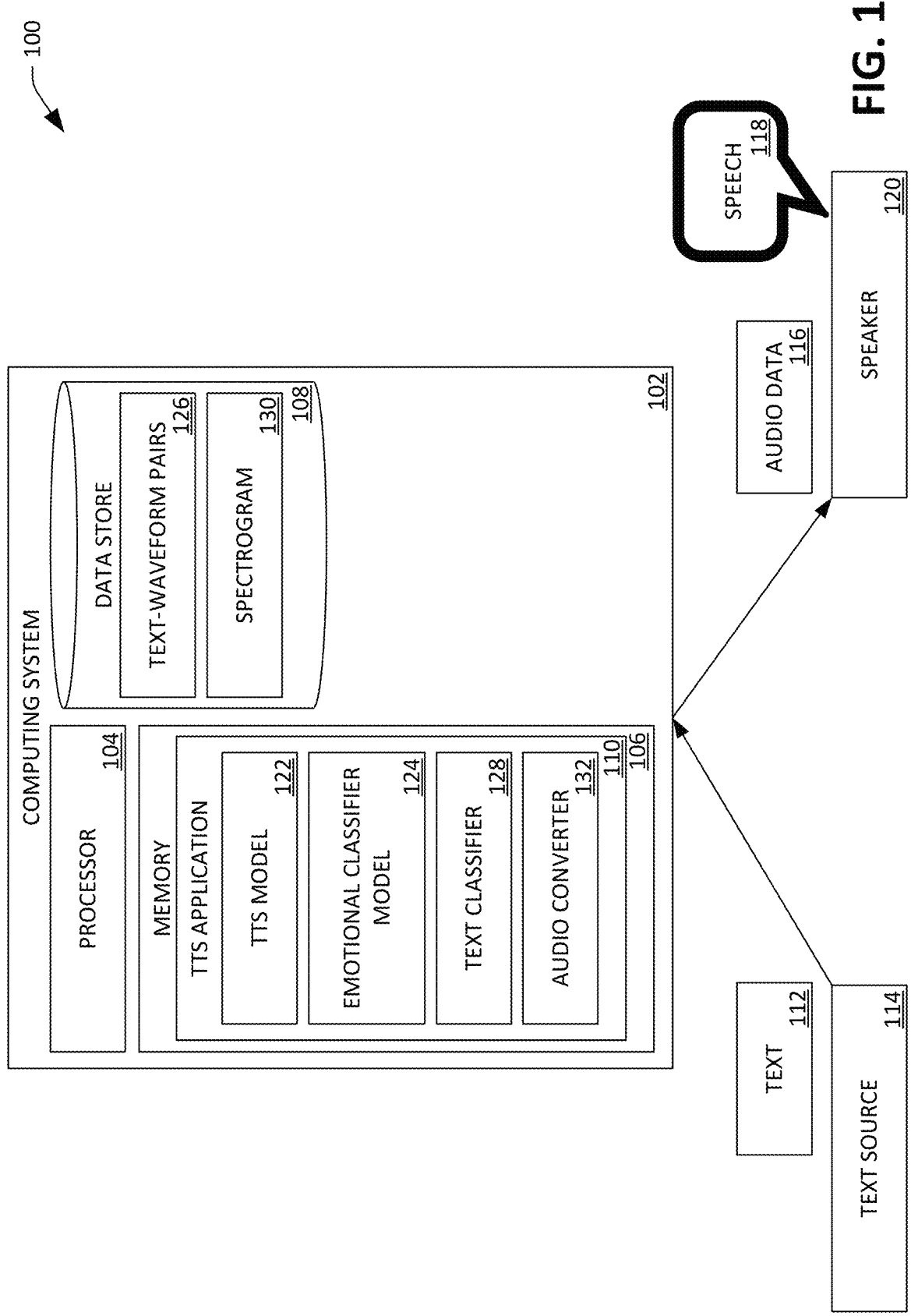
FIG. 1 is a functional block diagram of an example computing environment that facilitates domain expressive text to speech (TTS).

Various technologies pertaining to domain expressive TTS are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

DETAILED DESCRIPTION

As noted above, a conventional text to speech (TTS) computing system requires emotional labels both during model generation and at run-time in order for the TTS computing system to synthesize expressive speech. Conventional TTS computing systems also do not enable a user to specify a degree to which an emotion is expressed in synthesized speech or a domain (e.g., audiobook, call center, newscast, etc.) in which the synthesized speech is to be expressed. To address these issues, a computing system is described herein that is configured to obtain a textual embedding of computer-readable text, where an emotional classifier model outputs the textual embedding based upon the text. The computing system also obtains a phoneme encoding of the text from an encoder of a TTS model. The computing system synthesizes speech based upon the textual embedding and the phoneme encoding, where prosody features of the speech reflect an emotion underlying the text. The computing system does not require data labeled with emotional labels during model training or at run-time.

In example operation, a computing system obtains computer-readable text from an electronic source, where the text includes words. It is contemplated that the words may be associated with an emotion. In an example, the words of the text are "I am sorry for your loss." and hence the associated emotion is "sad." The computing system provides the text as input to an emotional classifier model that has been trained based upon emotional classification, that is, the emotional classifier models is trained with words or phrases that have emotional labels assigned thereto, where the emotional labels identify respective emotions assigned to the words or phrases (e.g., happy, sad, angry, etc.). The computing system obtains a textual embedding of the text as output of the emotional classifier model, where the textual embedding includes semantic information about the words of the text. In an example, the computing system obtains the textual embedding from a penultimate layer of the emotional classifier model.

The computing system generates a phoneme sequence based upon the words of the text. The computing system generates a phoneme embedding based upon the phoneme sequence. The computing system generates a phoneme encoding based upon the phoneme sequence. In an example, the computing system provides the phoneme embedding as input to an encoder of a TTS model. The encoder outputs a phoneme encoding based upon the input, where the phoneme encoding reflects acoustic or phonetic information about the text.

The computing system provides the textual embedding and the phoneme encoding as input to the TTS model. In an example, the computing system provides the textual embedding and the phoneme encoding as input to a decoder of the TTS model. In an example, the computing system concatenates the textual embedding and the phoneme encoding to generate a concatenation and provides the concatenation as input to the TTS model. The TTS model outputs a spectrogram (e.g., a mel spectrogram) based upon the textual embedding and the phoneme encoding, where the spectrogram includes features that reflect an emotion underlying the text. In an example where the TTS model includes the encoder, the decoder outputs the spectrogram based upon the textual embedding and the phoneme encoding. The computing system provides the spectrogram to an audio converter which converts the spectrogram into audio data (e.g., a waveform). The computing system provides the audio data to a speaker and the speaker outputs speech that includes the words in the text using the audio data, where the speech expresses the emotion. Prosody features of the speech correspond to the emotion associated with the text (due to the textual embedding described above). Following the example given above, the speech output by the speaker includes the words "I am sorry for your loss" and is styled in a manner that reflects a "sad" emotion.

According to some embodiments, the computing system receives an identifier for a domain (e.g., customer service) and the computing system provides the identifier for the domain as additional input to the TTS model. In an example, the computing system provides the identifier for the domain as input to an encoder of the TTS model. Prosody features of the speech correspond to a human speaker speaking in a context of the domain (e.g., a customer service representative speaking the words of the text to a customer) based upon the identifier for the domain being input to the TTS model (e.g., the decoder of the TTS model). According to some embodiments, the computing system receives a value that is indicative of an emotional intensity level. The computing system replaces the textual embedding with a second textual embedding based upon the value, where the second textual embedding corresponds to the emotional intensity level. The second textual embedding may be predefined for the value. The computing system provides the second textual embedding as input to the TTS model (e.g., a decoder of the TTS model) along with the phoneme encoding. Prosody features of the speech reflect the emotional intensity level based upon the second textual embedding and the phoneme encoding.

The above-described technologies present various advantages over conventional TTS computing systems. First, the above-described technologies do not require data that is labeled with emotional labels in order to train a TTS model. This reduces storage requirements and simplifies the training process of the TTS model. Additionally, the above-described technologies reduce time and computational costs associated with labeling. Second, at run-time, the above-described technologies do not require an emotional label to be provided along with text that is to be synthesized into speech, and thus the above-described technologies offer improved user experience. Furthermore, this results in computational advantages, as the technologies described above do not need to process an emotional label at run-time in order to synthesize the speech. Third, the above-described technologies enable a user to specify different "levels" of an emotion as described above. Fourth, the above-described technologies enable expressive speech to be synthesized that includes prosody features that reflect a particular domain.

With reference to FIG. 1, an example computing environment 100 that facilitates domain expressive TTS is illustrated. The computing environment 100 includes a computing system 102. According to embodiments, the computing system 102 is a server computing device. According to other embodiments, the computing system 102 is a cloud-based computing platform. According to further embodiments, the computing system 102 is a computing device operated by a user, such as a desktop computing device, a laptop computing device, a tablet computing device, a smartphone, a gaming console, a virtual reality computing device, an augmented reality computing device, or a wearable computing device.

The computing system 102 includes a processor 104 and memory 106. The computing system 102 may also include a data store 108. The memory 106 has a TTS application 110 loaded therein. As will be described in greater detail below, the TTS application 110, when executed by the processor 104, is generally configured to (1) obtain computer-readable text 112 from an (electronic) text source 114; (2) facilitate generation of audio data 116 (e.g., a waveform) based upon the computer-readable text 112; and (3) cause speech 118 to be played over a speaker 120 based upon the audio data 116, where the speech 118 reflects an emotion that is associated with words of the text 112.

According to embodiments, the text source 114 is the computing system 102, that is, the computing system 102 stores the text 112 in the memory 106 and/or the data store 108. According to other embodiments, the text source 114 is a server computing device that is under control of an entity different than an entity controlling the computing system 102 and the computing system 102 obtains the text 112 from the server computing device by way of a network. According to further embodiments, the text source 114 is a computing device operated by a user and the computing system 102 obtains the text 112 from the computing device by way of a network.

According to embodiments, the text 112 is included in an audiobook that is to be played to a user. According to other embodiments, the text 112 is generated by a chat bot that is communicating with a user, such as a customer service chat bot. According to some embodiments, the text 112 is included in a website, such as a news website or a customer service website of an entity. According to further embodiments, a first computing device operated by a first user receives the text 112 as input from the first user and the speaker 120 that plays the speech 118 is included in a second computing device operated by a second user.

According to embodiments, the speaker 120 is included in the computing system 102. According to other embodiments, the speaker 120 is included in a computing device operated by a user or a computing device that is in proximity to the user.

The TTS application 110 includes a (computer-implemented) TTS model 122. As will be explained in greater detail below, the TTS model 122 is generally configured to facilitate generation of the speech 118 from the text 112, where the speech 118 reflects an emotion associated with the text 112. The TTS model 122 may be trained based upon data that does not include emotional labels. Furthermore, the TTS model 122 does not require an emotional label to be provided with text at run-time in order to generate the speech 118 that reflects the emotion associated with the text 112. According to embodiments, the TTS model 122 is an end-to-end generative TTS model. According to embodiments, the TTS model 122 is or includes transformers or neural networks, such as recurrent neural networks (RNNs), Long Short Term Memory (LSTM) RNNs, and/or convolutional neural networks (CNNs). According to embodiments, the TTS model 122 is a FastSpeech2 model.

The TTS application 110 further includes a computer-implemented emotional classifier model 124. The emotional classifier model 124 is trained based upon emotional classification, that is, the emotional classifier model 124 is trained with words or phrases that have emotional labels assigned thereto, where the emotional labels identify respective emotions assigned to the words or phrases (e.g., happy, sad, angry, etc.). As such, the emotional classifier model 124 is configured to assign an emotional label (e.g., happy, sad, angry, etc.) to text based upon words of the text. According to embodiments, the emotional classifier model 124 is pre-trained. In an example, the text includes one or two sentences. As part of assigning the emotional label to the text, the emotional classifier model 124 generates a textual embedding (e.g., a vector representation) of the text, where the textual embedding includes semantic information about the words of the text. As will be described in greater detail below, the TTS application 110 utilizes the textual embedding (as opposed to the classification) of the text to generate the speech 118 that reflects an emotion associated with the text. According to embodiments, the emotional classifier model 124 includes a plurality of layers, where a last layer of the emotional classifier model 124 outputs a classification of text and where a penultimate layer of the emotional classifier model 124 outputs the textual embedding of the text. According to embodiments, the emotional classifier model 124 comprises a transformer model, an RNN-based model, or a LSTM RNN-based model. According to embodiments, the emotional classifier model 124 is a Bidirectional Encode Representations from Transformers (BERT) model, such as a robustly optimized BERT model (RoBERTa).

In an example training process of the TTS model 122, the computing system 102 (or another computing system) is provided with text-waveform pairs 126 that are stored in the data store 108. According to embodiments, the text-waveform pairs 126 do not include emotional labels, that is, a text-waveform pair in the text-waveform pairs 126 includes text and a waveform corresponding to the text, but not a label that is indicative of an emotion underlying the text. The computing system 102 inputs text of each of the text-waveform pairs 126 into the emotional classifier model 124 and the emotional classifier model 124 outputs textual embeddings of the text of each of the text-waveform pairs 126. The computing system 102 trains the TTS model 122 based upon the text-waveform pairs 126 and the textual embeddings. It is contemplated that the waveforms include speech expressed in different domains (e.g., a narrator of an audiobook narrating an audiobook, a newscaster reading the news, etc.).

According to embodiments, the memory 106 further includes a text classifier 128 and the text-waveform pairs 126 include emotional labels, that is, a text-waveform pair in the text-waveform pairs 126 includes text, a waveform corresponding to the text, and a label that is indicative of an emotion underlying the text. According to the embodiments, the computing system 102 (or another computing system) inputs the text from each of the text-waveform pairs 126 into the text classifier 128 and the text classifier 128 outputs a predicted label based upon the text for each of the text-waveform pairs 126. When the predicted label output by the text classifier 128 does not match the emotional label for the text-waveform pair, the computing system 102 removes the text-waveform pair from the text-waveforms pairs 126. In an example, if the predicted label for the text in the text-waveform pair is "happy", but the emotional label for the text is "sad", the computing system 102 removes the text-waveform pair from the text-waveform pairs 126. The computing system 102 repeats this process for each text-waveform pair in the text-waveform pairs 126. The computing system 102 then trains the TTS model 122 based upon the text-waveform pairs 126 (that no longer include text-waveform pairs having mismatched emotional labels and predicted labels) and the textual embeddings as described above.

According to embodiments, the memory 110 further includes the text classifier 128 and the text-waveform pairs 126 include emotional labels, that is, a text-waveform pair in the text-waveform pairs 126 includes text, a waveform corresponding to the text, and a label that is indicative of an emotion underlying the text. According to the embodiments, the text classifier 128 is a highly regularized logistic regression model. According to the embodiments, the computing system 102 (or another computing system) inputs text of each of the text-waveform pairs 126 into the emotional classifier model 124 and the emotional classifier model 124 outputs textual embeddings of the text of each of the text-waveform pairs 126. The computing system 102 inputs the textual embedding from each of the text-waveform pairs 126 into the text classifier 128 and the text classifier 128 outputs a predicted label based upon the textual embedding for each of the text-waveform pairs 126. When the predicted label output by the text classifier 128 does not match the emotional label for the text-waveform pair, the computing system 102 removes the text-waveform pair from the text-waveform pairs 126. In an example, if the predicted label for the textual embedding of the text in the text-waveform pair is "angry", but the emotional label for the text is "neutral", the computing system 102 removes the text-waveform pair from the text-waveform pairs 126. The computing system 102 repeats this process for each text-waveform pair in the text-waveform pairs 126. The computing system 102 then trains the TTS model 122 based upon the text-waveform pairs 126 (that no longer include text-waveform pairs having mismatched emotional labels and predicted labels) and the textual embeddings as described above.

As will be described in greater detail below, the TTS application 110, via the TTS model 122 and the emotional classifier model 124, generates a spectrogram 130 based upon the text 112, where the spectrogram 130 includes features that reflect an emotion associated with the text 112. In an example, the spectrogram 130 is a mel spectrogram. According to embodiments, the spectrogram 130 is retained in the data store 108. According to other embodiments, the spectrogram 130 is generated on demand and retained in the memory 106.

The TTS application 110 may further include an audio converter 132. According to embodiments, the audio converter 132 is included in a separate application that executes on a separate computing device. The audio converter 132 is generally configured to convert the spectrogram 130 into audio data 116 (e.g., a waveform) such that the speech 118 can be output by the speaker 120 based upon the audio data 116.

Figure 2:
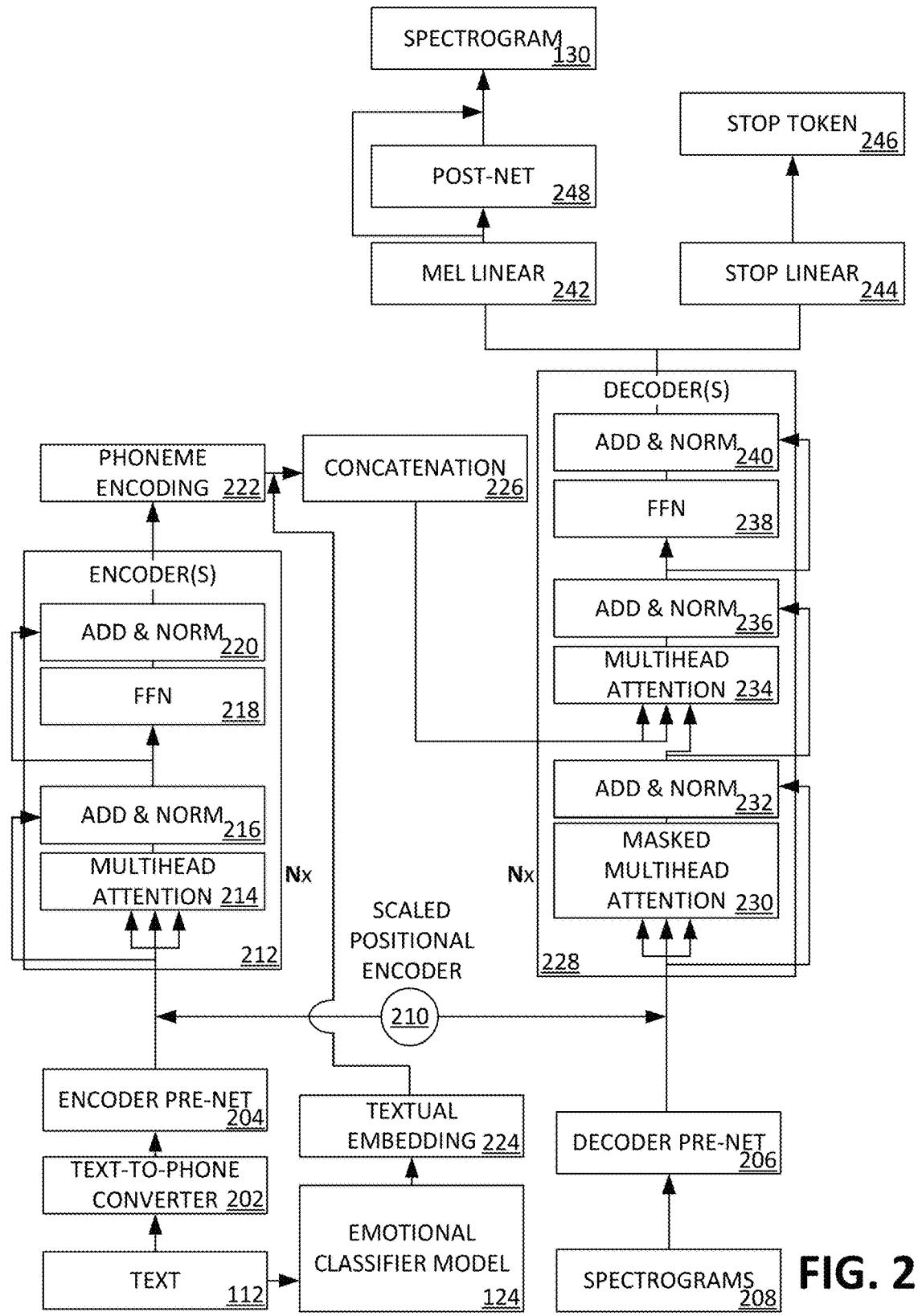
FIG. 2 is a functional block diagram of an example TTS model along with an emotional classifier model.

Turning now to FIG. 2, a functional block diagram 200 of the TTS model 122 and the emotional classifier model 124 is illustrated. The TTS model 122 includes a text-to-phone converter 202 that converts words of the text 112 into a phoneme sequence. The TTS model 122 further includes an encoder pre-net 204 that generates a phoneme embedding based upon the phoneme sequence. The TTS model 122 includes a decoder pre-net 206 that is configured to project spectrograms 208 (e.g., mel spectrograms) into the same subspace as phoneme embeddings (generated by the encoder pre-net 204) so that similarity of phoneme-mel frame pairs can be measured. The TTS model 122 includes a scaled positional encoder 210 that is configured to inject positional information into the output of the encoder pre-net 204 and the decoder pre-net 206. According to embodiments, the positional information is injected by triangle positional embeddings.

The TTS model 122 includes N encoder(s) 212, where N is a positive integer and where each of the encoder(s) 212 are connected to one another. Each encoder in the encoder(s) 212 includes a first multihead attention 214 that is connected to a first add & norm layer 216. The first multihead attention 214 takes output of the encoder pre-net 204 or output of a previous encoder in the encoder(s) 212 as input. Each encoder in the encoder(s) 212 also includes a first feed forward network (FFN) 218 that is connected to the first add & norm layer 216. Each encoder in the encoder(s) 212 further includes a second add & norm layer 220 that is connected to the first FFN 218 and the first add & norm layer 216. Ultimately, the encoder(s) 212 generate a phoneme encoding 222 based upon the phoneme embedding (which is generated from the phoneme sequence).

As depicted in FIG. 2, the emotional classifier model 124 takes the text 112 as input and outputs a textual embedding 224 based upon the input. In general, the textual embedding 224 captures semantic information about the text 112. The TTS model 122 concatenates the textual embedding 224 and the phoneme encoding 222 to generate a concatenation 226 of the textual embedding 224 and the phoneme encoding 222. According to embodiments, a variance adapter (not shown in FIG. 2) adds variance information to the phoneme encoding 222 (e.g., duration, pitch, and energy).

The TTS model 122 further includes N decoder(s) 228, where N is a positive integer. Each decoder in the decoder(s) 228 includes a masked multihead attention 230 that takes output of the decoder pre-net 206 or output of a previous decoder in the decoder(s) 228 as input. The masked multihead attention 230 is connected to a third add & norm layer 232 in each decoder in the decoder(s) 228. The third add & norm layer 232 is connected to a second multihead attention 234 in each decoder in the decoder(s) 228. The second multihead attention 234 takes, as input, the concatenation 226 as well as data output by the third add & norm layer 232. The second multihead attention 234 is connected to a fourth add & norm layer 236 in each decoder in the decoder(s) 228. The fourth add and norm layer 236 is connected to the third add & norm layer 232 and a second FFN 238 in each decoder in the decoder(s) 228. The second FFN 238 is connected to a fifth add & norm layer 240 in each decoder in the decoder(s) 228. The fifth add & norm layer 240 is also connected to the fourth add & norm layer 236 in each decoder in the decoder(s) 228.

The TTS model 122 includes a mel linear projection 242 that predicts a predicted spectrogram and a stop linear projection 244 that predicts a stop token 246. The predicted spectrogram is input to a post-net 248 with residual connections to generate the spectrogram 130 (e.g., a mel spectrogram).

Referring generally now to FIGS. 1 and 2, example operation of the computing environment 100 is now set forth. Although it is understood that there may be N encoder(s) 212 and N decoder(s) 228 in the TTS model 122, the N encoder(s) 212 will be referred to below as "the encoder 212" and the N decoder(s) 228 will be referred to below as "the decoder 228" for ease of explanation. The TTS application 110 obtains the text 112 from the text source 114. In an example, the text 112 includes the sentence: "We cannot currently offer you this loan, we are sorry for informing you so late." and as such, the text is associated with a "sad" emotion. The TTS application 110 provides the text 112 as input to the emotional classifier model 124. The emotional classifier model 124 outputs the textual embedding 224 based upon the text 112, where the textual embedding 224 captures semantic information about words in the text 112. The TTS application 110 obtains the textual embedding 224 from the emotional classifier model 124.

The TTS application 110 generates a phoneme sequence by way of the text-to-phone converter 202 based upon the text 112. In an example, a phoneme in the phoneme sequence is a sound or a group of different sounds perceived to have a same function by speakers of a particular language. The TTS application 110 generates, by way of the encoder pre-net 204, a phoneme embedding based upon the phoneme sequence. The TTS application 110 generates, by way of the encoder 212 of the TTS model 122, the phoneme encoding 222 based upon the phoneme embedding.

The TTS application 110 provides the textual embedding 224 and the phoneme encoding 222 as input to the decoder 228 of the TTS model 122. In an example, the TTS application 110 concatenates the textual embedding 224 and the phoneme encoding 222 to generate the concatenation 226 and provides the concatenation 226 as input to the decoder 228. The decoder 228 of the TTS model 122 outputs, based upon the textual embedding 224 and the phoneme encoding 222, the spectrogram 130, where the spectrogram 130 includes features that are indicative of the words in the computer-readable text 112 and that are reflective of an emotion that is associated with the text 112, that is, the spectrogram 130 is indicative of an emotion that is to be expressed when the words of the text 112 are audibly output. In an example, the spectrogram 130 is a mel spectrogram. According to embodiments, the TTS application 110 stores the spectrogram 130 in the data store 108. According to other embodiments, the spectrogram 130 is retained in the memory 110. The audio converter 132 converts the spectrogram 130 into the audio data 116 (e.g., a waveform). The TTS application 110 provides the audio data 116 to the speaker 120, where the speaker 120 outputs the speech 118 based upon the audio data 116 and where prosody features of the speech 118 reflect an emotion associated with the words in the text 112 (due to the textual embedding 224 generated by the emotional classifier model 124). According to embodiments, the spectrogram 130 is converted into the audio data 116 and provided (e.g., transmitted) to the speaker 120 responsive to the TTS application 110 receiving an indication from a computing device. In acoustic terms, the prosody features of the speech 118 that reflect the emotion include fundamental frequency (as measured in hertz), duration (as measured in milliseconds or seconds), intensity (as measured in decibels) and/or spectral characteristics (e.g., distribution of energy at different parts of the audible frequency range). In auditory terms, the prosody features of the speech 118 that reflect the emotion include pitch of the speech 118, length of sounds in the speech 118, loudness of the speech 118, and/or timbre of the speech 118. Following the example given above, the speech 118 includes the words "We cannot currently offer you this loan, we are sorry for informing you so late" and is styled in a "sad" tone.

According to embodiments, the TTS application 110 receives an identifier for a human speaker. The identifier for the human speaker may relate to vocal characteristics such as timbre. The TTS application 110 provides the identifier for the human speaker as additional input to the TTS model 122 (e.g., as input to the decoder 228 of the TTS model 122). The speech 118 played over the speaker 120 is styled in a voice of the human speaker based upon the identifier for the human speaker being input to the TTS model 122.

According to embodiments, the TTS application 110 receives an identifier for a domain. Example domains include call center, announcement, newscast, conversation, and audiobook. The identifier for the domain may be a one hot vector. The TTS application 110 provides the identifier for the domain as additional input to the TTS model 122 (e.g., as input to the decoder 228 of the TTS model 122). Prosody features of the speech 118 correspond to a human speaker speaking in a context of the domain (e.g., a narrator of an audiobook, a newscaster reading news, etc.) based upon the identifier for the domain being input to the TTS model 122.

According to embodiments, the TTS application 110 receives a value that is indicative of an emotional intensity level. The TTS application 110 provides replaces the textual embedding with a second textual embedding based upon the value, where the second textual embedding corresponds to the emotional intensity level. The second textual embedding may be predefined for the value. The TTS application 110 provides the second textual embedding (in place of the textual embedding 224) and the phoneme encoding as input to the TTS model 122 (e.g., as input to the decoder 228 of the TTS model 122). Prosody of the speech 118 played over the speaker 120 reflects the emotional intensity level based upon the second textual embedding.

Figure 3:
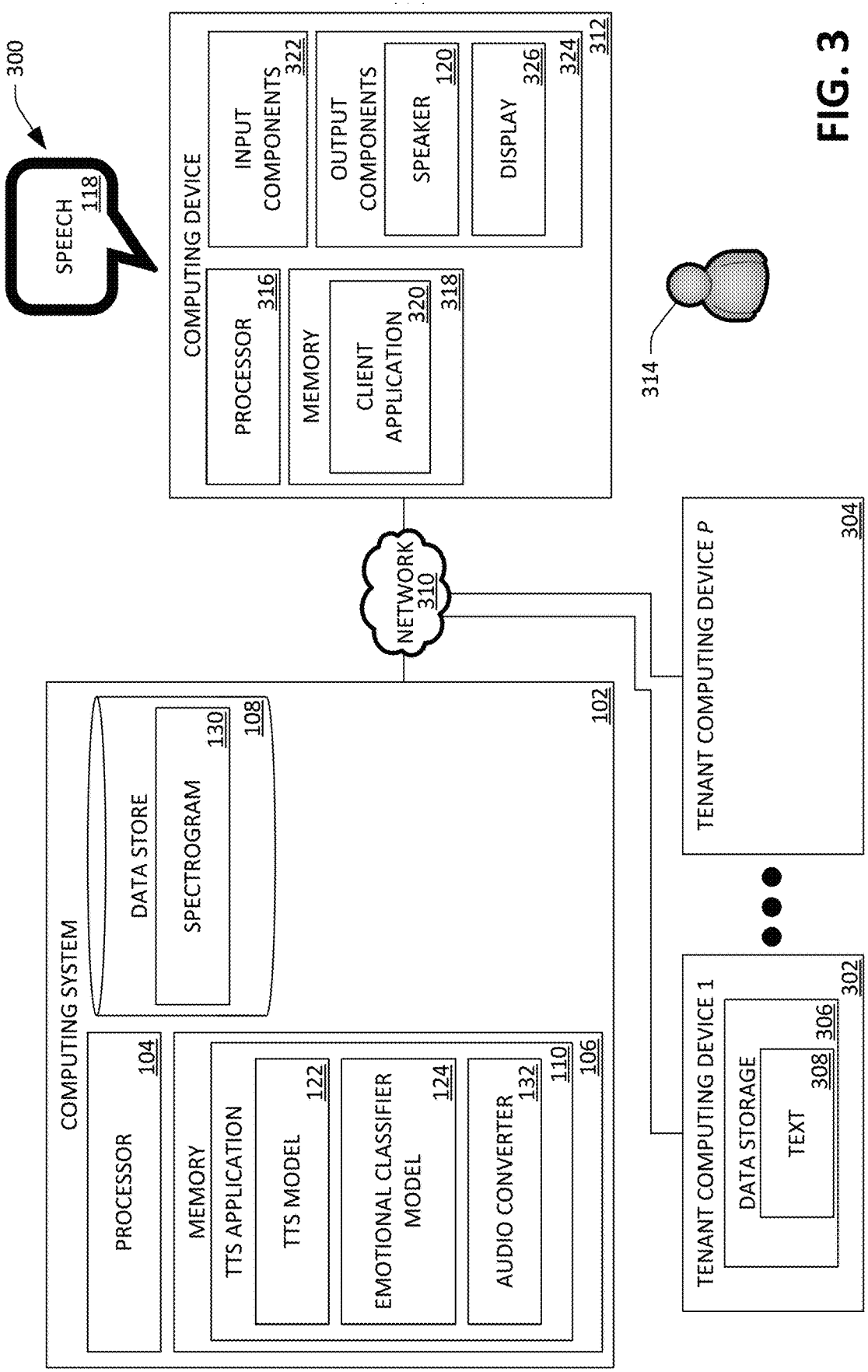
FIG. 3 is a functional block diagram of an example computing environment that provides domain expressive TTS as a service.

Referring now to FIG. 3, an example computing environment 300 that provides domain expressive TTS as a service is illustrated. The computing environment 300 includes the computing system 102 and its various components described above (e.g., TTS model 122, the emotional classifier model 124, etc.). Although not depicted in FIG. 3, it is to be understood that the computing system 102 may include the text-waveform pairs 126 and the text classifier 128 described above in the description of FIG. 1. The computing environment 300 further includes a first tenant computing device 302 under control of a first entity and a Pth tenant computing device 304 under control of a Pth entity, where P is a positive integer greater than one (collectively referred to herein as "the plurality of tenant computing devices 302-304"). The computing system 102 provides text to speech as a service to the first entity and the Pth entity. The plurality of tenant computing device 302 may include server computing devices, computing devices operated by users, and/or cloud-based computing platforms. The first tenant computing device 302 includes data storage 306 (e.g., memory, a data store, etc.) that stores text 308. In an example, the text 308 is text from a website. The Pth tenant computing device 304 also includes data storage that stores second text (not depicted in FIG. 3). In another example, the text 308 is generated by a chatbot that is provided by the first entity via the first tenant computing device 302. The plurality of tenant computing device 302-304 are in communication with the computing system 102 by way of a network 310 (e.g., the Internet).

The computing environment 300 further includes a computing device 312 that is operated by a user 314. The computing device 312 is in communication with the computing system 102 by way of the network 310. The computing device 312 is also in communication with one or more of the plurality of tenant computing devices 302-304 by way of the network 310. The computing device 312 may be a desktop computing device, a laptop computing device, a smartphone, a tablet, a virtual reality computing device, an augmented reality computing device, or a wearable computing device. The computing device 312 includes a processor 316 and memory 318, where the memory 318 has a client application 320 loaded therein. The client application 320, when executed by the processor 316 may initiate synthesis of the speech 118 from the text 308. In an example, the client application 320 is a web browser that displays a webpage of the first entity, such as a customer service website. In another example, the client application 320 is an audiobook application.

The computing device 312 includes input components 322 that enable the user 314 to set forth input to the computing device 312. The input components 322 may include a mouse, a keyboard, a trackpad, a scroll wheel, a touchscreen, a camera, a video camera, a microphone, and/or a controller. The computing device 312 includes output components 324 that output information to the user 314. The output components 324 include the speaker 120. The output components 324 may also include a display 326 that presents graphical features thereon. The graphical features may include a graphical user interface (GUI) of the client application 320. In an example, the client application 320 presents a webpage on the display 326.

The computing environment 300 operates in a manner similar to the computing environment 100 described above. It is contemplated that the TTS application 110 receives an indication that the speech 118 is to be synthesized from the text 308. In one example, the indication is received by the TTS application 110 from the client application 320 when the client application 320 is loaded on the computing device 312. In another example, the indication is received by the TTS application 110 from the client application 320 when the user 314 selects an element displayed on the display 326, such as when the text 308 is displayed on the display 326. In a further example, the first tenant computing device 302 transmits the text 308 to the computing system 102 responsive to the first tenant computing device 302 receiving an indication that the user 314 has accessed a website (via the computing device 312) provided by the first entity, such as a customer service website. In yet another example involving a chatbot provided by the first tenant computing device 302, the client application 320 receives a message directed towards the chatbot as input from the user 314 and transmits the message to the first tenant computing device 302. The first tenant computing device 302 generates the text 308 as a response to the message and transmits the text 308 to the TTS application 110.

The TTS application 110 performs the above-described processes on the text 308 to cause the speech 118 to be played over the speaker 120, where the speech 118 includes the words of the text 308 and where prosody features of the speech 118 reflect an emotion that is associated with the words in the text 308.

Figure 4:
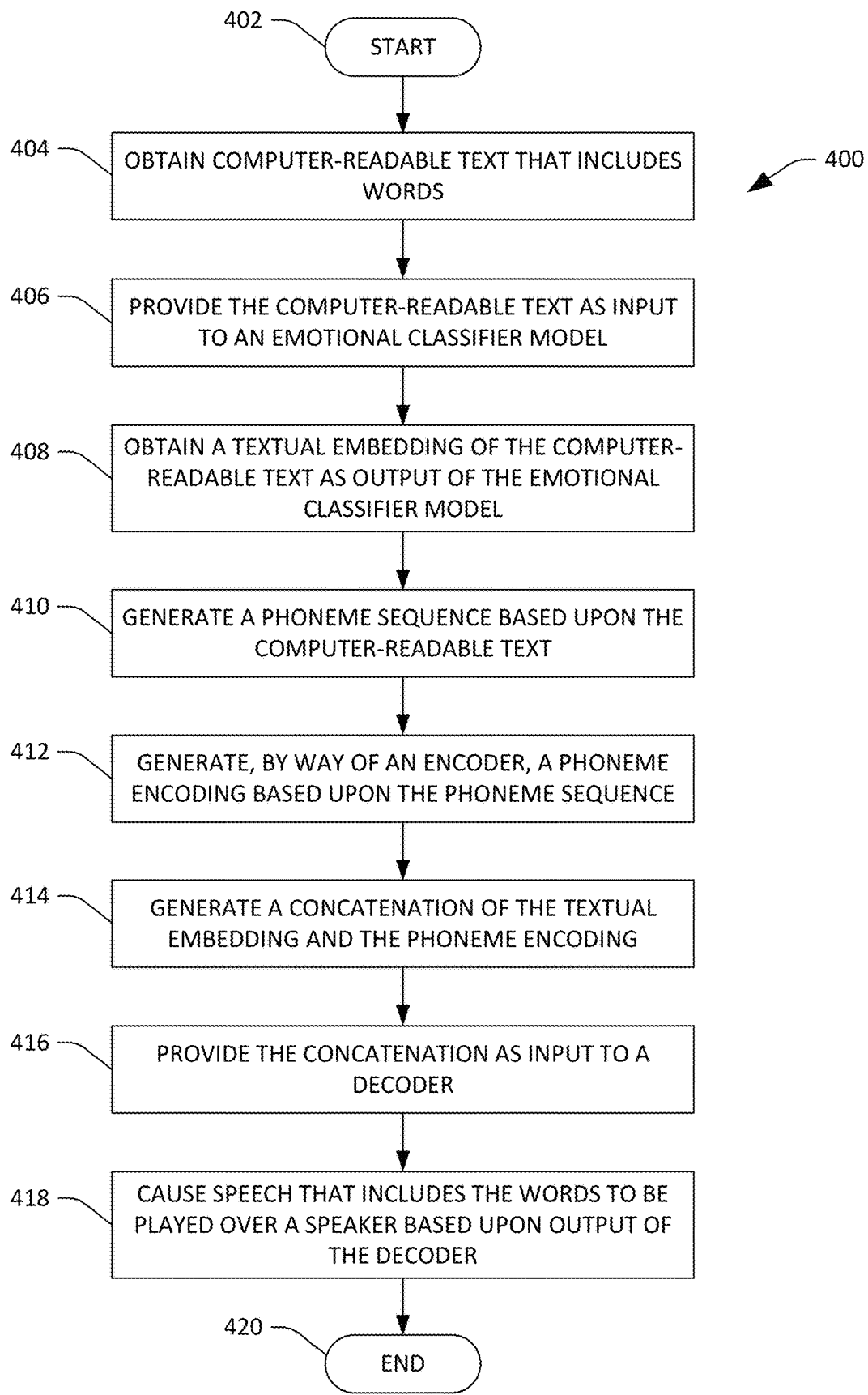
FIG. 4 is a flow diagram that illustrates an example methodology performed by a computing system that facilitates domain expressive TTS.

FIG. 4 illustrates an example methodology relating to domain expressive TTS. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement the methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodology can be stored in a computer-readable medium, displayed on a display device, and/or the like.

Referring now to FIG. 4, an example methodology 400 performed by a computing system that facilitates domain expressive TTS is illustrated. The methodology 400 begins at 402, and at 404, the computing system obtains computer-readable text that includes words. The words of the computer-readable text is associated with an emotion (e.g., happy, sad, etc.). At 406, the computing system provides the computer-readable text as input to an emotional classifier model. The emotional classifier model has been trained based upon emotional classification, that is, the emotional classifier model has been trained based upon a plurality of words having emotional labels assigned thereto, where the emotional labels identify respective emotions assigned to the plurality of words. At 408, the computing system obtains a textual embedding of the computer-readable text as output of the emotional classifier model, where the textual embedding represents semantics of the words. At 410, the computing system generates a phoneme sequence based upon the words of the computer-readable text. At 412, the computing system generates, by way of an encoder of a TTS model, a phoneme encoding based upon the phoneme sequence. At 414, the computing system generates a concatenation of the textual embedding and the phoneme encoding. At 416, the computing system provides the concatenation as input to a decoder of the TTS model. The decoder of the TTS model generates an output for the words that is indicative of the emotion that is to be expressed when the words are audibly output. At 418, the computing system causes speech that includes the words to be played over a speaker based upon output of the decoder of the TTS model, where the speech expresses the emotion. In an example, prosody features of the speech correspond to the emotion associated with the words of the computer-readable text. The methodology 400 concludes at 420.

Figure 5:
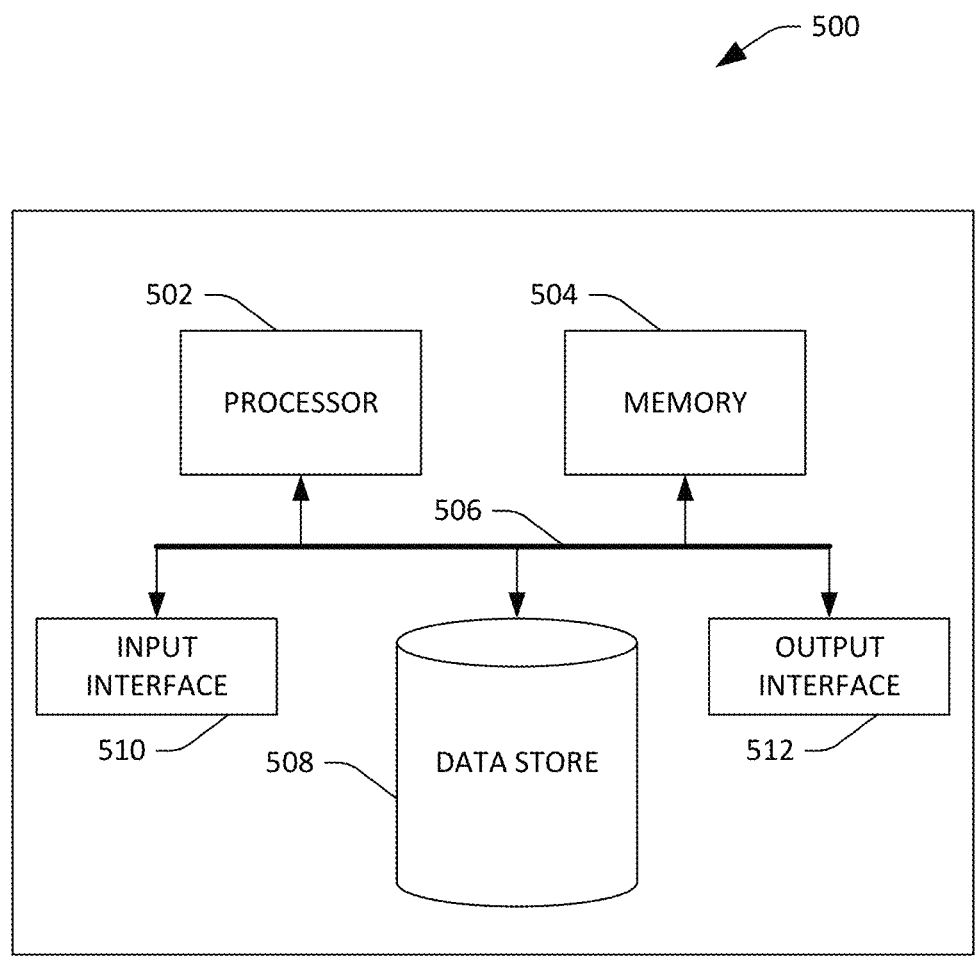
FIG. 5 depicts an example computing device.

Referring now to FIG. 5, a high-level illustration of an example computing device 500 that can be used in accordance with the systems and methodologies disclosed herein is illustrated. For instance, the computing device 500 may be used in a system that generates speech based upon computer-readable text, where the speech reflects an emotion underlying the computer-readable text. By way of another example, the computing device 500 can be used in a system that plays speech over a speaker based upon computer-readable text. The computing device 500 includes at least one processor 502 that executes instructions that are stored in a memory 504. The instructions may be, for instance, instructions for implementing functionality described as being carried out by one or more components discussed above or instructions for implementing one or more of the methods described above. The processor 502 may access the memory 504 by way of a system bus 506. In addition to storing executable instructions, the memory 504 may also store computer-readable text that includes words, TTS models, emotional classifier models, spectrograms, audio data, text classifiers, text-waveform pairs, etc.

The computing device 500 additionally includes a data store 508 that is accessible by the processor 502 by way of the system bus 506. The data store 508 may include executable instructions, computer-readable text that includes words, TTS models, emotional classifier models, spectrograms, audio data, text classifiers, text-waveform pairs, etc.

The computing device 500 also includes an input interface 510 that allows external devices to communicate with the computing device 500. For instance, the input interface 510 may be used to receive instructions from an external computer device, from a user, etc. The computing device 500 also includes an output interface 512 that interfaces the computing device 500 with one or more external devices. For example, the computing device 500 may display text, images, etc. by way of the output interface 512.

It is contemplated that the external devices that communicate with the computing device 500 via the input interface 510 and the output interface 512 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 500 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 500 may be a distributed system. Thus, for instance, several devices may be in communication by way of a network connection and may collectively perform tasks described as being performed by the computing device 500.

The present disclosure relates to domain expressive text to speech according to at least the following examples:

(A1) In one aspect, some embodiments include a method (e.g., 400) executed by a processor (e.g., 104) of a computing system (e.g., 102). The method includes obtaining (e.g., 404) computer-readable text (e.g., 112) comprising words. The method further includes providing (e.g., 406) the computer-readable text as input to an emotional classifier model (e.g., 124) that has been trained based upon a plurality of words having emotional labels assigned thereto, where the emotional labels identify respective emotions assigned to the plurality of words. The method additionally includes obtaining (e.g., 408) a textual embedding (e.g., 224) of the computer-readable text as output of the emotional classifier model, where the textual embedding represents semantics of the words. The method also includes generating (e.g., 410) a phoneme sequence based upon the words of the computer-readable text. The method further includes generating (e.g., 412), by way of an encoder (e.g., 212) of a text to speech (TTS) model (e.g., 122), a phoneme encoding (e.g., 222) based upon the phoneme sequence. The method additionally includes generating (e.g., 414) a concatenation (e.g., 226) of the textual embedding and the phoneme encoding. The method also includes providing (e.g., 416) the concatenation as input to a decoder (e.g., 228) of the TTS model, where the decoder of the TTS model generates an output for the words that is indicative of an emotion to be expressed when the words are audibly output. The method further includes causing (e.g., 418) speech (e.g., 118) that includes the words to be played over a speaker (e.g., 120) based upon the output of the decoder of the TTS model, where the speech expresses the emotion.

(A2) According to some embodiments of the method of A1, the method further includes prior to obtaining the computer-readable text, training the TTS model based upon data that does not include labels.

A technical advantage of the method of A2 is that the TTS model does not require labeled training data, which reduces storage requirements, eases network burdens, and simplifies the training process.

(A3) According to some embodiments of any of the methods of A1-A2, the emotional classifier model includes a plurality of layers, where a last layer of the emotional classifier model is configured to output an emotional classification, and where a penultimate layer of the emotional classifier model outputs the textual embedding.

A technical advantage of the method of A3 is that the textual embedding captures semantic information about the words of the text, which facilitates synthesis of expressive emotional speech from the words of the text.

(A4) According to some embodiments of any of the methods of A1-A3, the output of the decoder of the TTS model includes a spectrogram (e.g., 130). Causing the speech to be played over the speaker includes converting the spectrogram into a waveform and providing the waveform to the speaker, where the speaker outputs the speech using the waveform.

(A5) According to some embodiments of the method of A4, converting the spectrogram into the waveform and transmitting the waveform to the speaker occur responsive to receiving an indication from a computing device (e.g., 312).

A technical advantage of the method of A5 is that the expressive emotional speech is played over a speaker without requiring an emotional label to be provided to the computing system.

(A6) According to some embodiments of any of the methods of A1-A5, generating the phoneme encoding based upon the phoneme sequence includes generating a phoneme embedding based upon the phoneme sequence and inputting the phoneme embedding to the encoder, where the encoder outputs the phoneme encoding based upon the phoneme embedding.

(B1) In another aspect, some embodiments include a computing system (e.g., 102) that includes a processor (e.g., 104) and memory (e.g., 106). The memory stores instructions that, when executed by the processor, cause the processor to perform any of the methods described herein (e.g., any of A1-A6).

(C1) In yet another aspect, some embodiments include a non-transitory computer-readable storage medium that includes instructions that, when executed by a processor (e.g., 104) of a computing system (e.g., 102), cause the processor to perform any of the methods described herein (e.g., any of A1-A6).

(D1)) In another aspect, some embodiments include a method executed by a computing system (e.g., 102) that includes a processor (e.g., 104) and memory (e.g., 106). The method includes obtaining computer-readable text (e.g., 112) comprising words. The method further includes providing the computer-readable text as input to an emotional classifier model (e.g., 124) that has been trained based upon a plurality of words having emotional labels assigned thereto, where the emotional labels identify respective emotions assigned to the plurality of words. The method additionally includes obtaining a textual embedding (e.g., 224) of the computer-readable text as output of the emotional classifier model, where the textual embedding represents semantics of the words. The method also includes generating a phoneme sequence based upon the words of the computer-readable text. The method further includes generating a phoneme encoding (e.g., 222) based upon the phoneme sequence. The method additionally includes providing the textual embedding and the phoneme encoding as input to a text to speech (TTS) model (e.g., 122), where the TTS model generates an output for the words that is indicative of an emotion to be expressed when the words are audibly output. The method also includes causing speech (e.g., 118) that includes the words to be played over a speaker (e.g., 120) based upon the output of the TTS model, where the speech expresses the emotion.

(D2) In some embodiments of the method of D1, providing the textual embedding and the phoneme encoding as input to the TTS model includes generating a concatenation (e.g., 226) of the textual embedding and the phoneme encoding and inputting the concatenation to the TTS model.

A technical advantage of the method of D2 is that the TTS model is able to synthesize expressive emotional speech due to the input of the concatenation which includes the textual embedding, which captures semantic information about the words of the computer-readable text.

(D3) In some embodiments of any of the methods of D1-D2, the emotional classifier model comprises a transformer model.

A technical advantage of the method of D3 is that the transformer model is able to synthesize expressive emotional speech.

(D4) In some embodiments of any of the methods of D1-D3, the phoneme encoding is generated by way of an encoder (e.g., 212) of the TTS model, where the textual embedding and the phoneme encoding are provided as input to a decoder (e.g., 228) of the TTS model, where the decoder generates the output.

A technical advantage of the method of D4 is that because the textual embedding captures semantic information about the words of the computer-readable text, the decoder of the TTS model is able to synthesize expressive emotional speech.

(D5) In some embodiments of any of the methods of D1-D4, prosody features of the speech correspond to the emotion.

(D6) In some embodiments of the method of D5, the prosody features include one or more of fundamental frequency, duration, intensity, or spectral characteristics.

(D7) In some embodiments of any of the methods of D1-D6, the output of the TTS model includes a spectrogram (e.g., 130) and causing the speech to be played over the speaker includes converting the spectrogram into a waveform and providing the waveform to the speaker, where the speaker outputs the speech based upon the waveform.

(D8) In some embodiments of the method of D7, the spectrogram includes a mel spectrogram.

(D9) In some embodiments of any of the methods of D1-D8, the method further includes receiving an identifier for a human speaker, where the identifier for the speaker is provided as additional input to the TTS model, and further where the speech is styled in a voice of the human speaker based upon the identifier for the speaker being input to the TTS model.

(D10) In some embodiments of any of the methods of D1-D9, the method further includes receiving an identifier for a domain, where the identifier for the domain is provided as additional input to the TTS model, and further where prosody features of the speech correspond to a human speaker speaking in a context of the domain based upon the identifier for the domain being input to the TTS model.

A technical advantage of the method of D10 is that the TTS model is able to synthesize domain expressive speech based upon the identifier for the domain being input to the TTS model.

(D11) In some embodiments of any of the methods of D1-D10, the method further includes receiving a value that is indicative of an emotional intensity level, where the textual embedding is replaced with a second textual embedding based upon the value, where the second textual embedding is provided as input to the TTS model in place of the textual embedding, where prosody features of the speech reflect the emotional intensity level based upon the second textual embedding.

A technical advantage of the method of D11 is that the TTS model is able to synthesize emotional speech of different intensity levels due to the second textual embedding being input to the TTS model in place of the textual embedding.

(E1) In another aspect, some embodiments include a computing system (e.g., 102) including a processor (e.g., 104) and memory (e.g., 106). The memory stores instructions that, when executed by the processor, cause the processor to perform any of the methods described herein (e.g., any of D1-D11).

(F1) In yet another aspect, some embodiments include a non-transitory computer-readable storage medium that includes instructions that, when executed by a processor (e.g., 104) of a computing system (e.g., 102), cause the processor to perform any of the methods described herein (e.g., any of D1-D11).

(G1) In another aspect, some embodiments include a method performed by a computing system (e.g., 102) that includes a processor (e.g., 104). The method includes obtaining computer-readable text (e.g., 112, 308) over a network (e.g., 310) connection from a server computing device that is under control of an entity, where the computer-readable text comprises words. The method further includes providing the computer-readable text as input to an emotional classifier model (e.g., 124) that has been trained based upon a plurality of words having emotional labels assigned thereto, where the emotional labels identify respective emotions assigned to the plurality of words. The method additionally includes obtaining a textual embedding (e.g., 224) of the computer-readable text as output of the emotional classifier model, where the textual embedding represents semantics of the words. The method also includes generating a phoneme sequence based upon the computer-readable text. The method further includes generating, by way of an encoder (e.g., 212) of a text to speech (TTS) model (e.g., 122), a phoneme encoding (e.g., 222) based upon the phoneme sequence. The method additionally includes providing the textual embedding and the phoneme encoding as input to a decoder (e.g., 228) of the TTS model, where the decoder of the TTS model generates an output for the words that is indicative of an emotion to be expressed when the words are audibly output. The method also includes causing speech (e.g., 118) that includes the words to be played to a user (e.g., 314) over a speaker (e.g., 120) comprised by a computing device (e.g., 312) based upon the output of the decoder of the TTS model, where the speech expresses the emotion.

(G2) In some embodiments of the method of G1, the server computing device transmits the computer-readable text to the computing system responsive to the server computing device receiving an indication that the user has accessed a website provided by the entity.

(G3) In some embodiments of the method of G2, the website is a customer service website.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. Such computer-readable storage media can include random-access memory (RAM), read-only memory (ROM), electrically erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

As used herein, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system, comprising:
a processor; and
memory storing instructions that, when executed by the processor, cause the processor to perform acts comprising:
obtaining computer-readable text comprising words;
providing the computer-readable text as input to an emotional classifier model that has been trained based upon a plurality of words having emotional labels assigned thereto, wherein the emotional labels identify respective emotions assigned to the plurality of words;
obtaining a first textual embedding of the computer-readable text as output of the emotional classifier model, wherein the first textual embedding represents semantics of the words;
generating a phoneme sequence based upon the words of the computer-readable text;
generating a phoneme encoding based upon the phoneme sequence;
providing the first textual embedding and the phoneme encoding as input to a text to speech (TTS) model, wherein the TTS model is trained using text-waveform pairs without emotional labels, wherein the TTS model generates a first output for the words that is indicative of an emotion and a first emotional intensity level be expressed when the words are audibly output;
receiving a value that is indicative of a second emotional intensity level;
replacing the first textual embedding with a second textual embedding based upon the value;
providing the second textual embedding as input to the TTS model in place of the first textual embedding, wherein the TTS model generates a second output for the words that is indicative of a second emotional intensity level of the words when the words are audibly output; and
causing speech that includes the words to be played over a speaker based upon the second output of the TTS model, wherein the speech expresses the emotion and the second emotional intensity level.

2. The computing system of claim 1, wherein providing the first textual embedding and the phoneme encoding as input to the TTS model comprises:
generating a concatenation of the first textual embedding and the phoneme encoding; and
inputting the concatenation to the TTS model.

3. The computing system of claim 1, wherein the emotional classifier model comprises a transformer model.

4. The computing system of claim 1, wherein the phoneme encoding is generated by way of an encoder of the TTS model, wherein the first textual embedding and the phoneme encoding are provided as input to a decoder of the TTS model, wherein the decoder generates the first output.

5. The computing system of claim 1, wherein prosody features of the speech correspond to the emotion.

6. The computing system of claim 5, wherein the prosody features comprise one or more of:
fundamental frequency;
duration;
intensity; or
spectral characteristics.

7. The computing system of claim 1, wherein the second output of the TTS model includes a spectrogram, wherein causing the speech to be played over the speaker comprises:
converting the spectrogram into a waveform; and
providing the waveform to the speaker, wherein the speaker outputs the speech based upon the waveform.

8. The computing system of claim 7, wherein the spectrogram comprises a mel spectrogram.

9. The computing system of claim 1, the acts further comprising:
receiving an identifier for a human speaker, wherein the identifier for the speaker is provided as additional input to the TTS model, and further wherein the speech is styled in a voice of the human speaker based upon the identifier for the speaker being input to the TTS model.

10. The computing system of claim 1, the acts further comprising:
receiving an identifier for a domain, wherein the identifier for the domain is provided as additional input to the TTS model, and further wherein prosody features of the speech correspond to a human speaker speaking in a context of the domain based upon the identifier for the domain being input to the TTS model.

11. A method executed by a processor of a computing system, the method comprising:
obtaining computer-readable text comprising words;
providing the computer-readable text as input to an emotional classifier model that has been trained based upon a plurality of words having emotional labels assigned thereto, wherein the emotional labels identify respective emotions assigned to the plurality of words;
obtaining a first textual embedding of the computer-readable text as output of the emotional classifier model, wherein the first textual embedding represents semantics of the words;
generating a phoneme sequence based upon the words of the computer-readable text;
generating, by way of an encoder of a text to speech (TTS) model, a phoneme encoding based upon the phoneme sequence;
generating a concatenation of the first textual embedding and the phoneme encoding;
providing the concatenation as input to a decoder of the TTS model, wherein the TTS model is trained using text-waveform pairs without emotional labels, wherein the decoder of the TTS model generates a first output for the words that is indicative of an emotion and a first emotional intensity level to be expressed when the words are audibly output;
receiving a value that is indicative of a second emotional intensity level;
replacing the first textual embedding with a second textual embedding based upon the value;

providing the second textual embedding as input to the decoder of the TTS model in place of the concatenation, wherein the TTS model generates a second output for the words that is indicative of the second emotional intensity level of the words when the words are audibly output; and causing speech that includes the words to be played over a speaker based upon the second output of the decoder of the TTS model, wherein the speech expresses the emotion and the second emotional intensity level.

12. The method of claim 11, wherein the emotional classifier model includes a plurality of layers, wherein a last layer of the emotional classifier model is configured to output an emotional classification, wherein a penultimate layer of the emotional classifier model outputs the textual embedding.

13. The method of claim 11, wherein the first output of the decoder of the TTS model includes a spectrogram, wherein causing the speech to be played over the speaker comprises:
converting the spectrogram into a waveform; and
providing the waveform to the speaker, wherein the speaker outputs the speech using the waveform.

14. The method of claim 13, wherein converting the spectrogram into the waveform and transmitting the waveform to the speaker occur responsive to receiving an indication from a computing device.

15. The method of claim 11, wherein generating the phoneme encoding based upon the phoneme sequence comprises:
generating a phoneme embedding based upon the phoneme sequence;
inputting the phoneme embedding to the encoder, wherein the encoder outputs the phoneme encoding based upon the phoneme embedding.

16. A non-transitory computer-readable storage medium comprising instructions that, when executed by a processor of a computing system, cause the processor to perform acts comprising:
obtaining computer-readable text over a network connection from a server computing device that is under control of an entity, wherein the computer-readable text comprises words;
providing the computer-readable text as input to an emotional classifier model that has been trained based upon a plurality of words having emotional labels assigned thereto, wherein the emotional labels identify respective emotions assigned to the plurality of words;
obtaining a first textual embedding of the computer-readable text as output of the emotional classifier model, wherein the first textual embedding represents semantics of the words;
generating a phoneme sequence based upon the computer-readable text;
generating, by way of an encoder of a text to speech (TTS) model, a phoneme encoding based upon the phoneme sequence;
providing the first textual embedding and the phoneme encoding as input to a decoder of the TTS model, wherein the TTS model is trained using text-waveform pairs without emotional labels, wherein the decoder of the TTS model generates a first output for the words that is indicative of an emotion and a first emotional intensity level to be expressed when the words are audibly output;
receiving a value that is indicative of a second emotional intensity level;
replacing the first textual embedding with a second textual embedding based upon the value;
providing the second textual embedding as input to the TTS model in place of the first textual embedding, wherein the TTS model generates a second output for the words that is indicative of a second emotional intensity of the words when the words are audibly output; and
causing speech that includes the words to be played to a user over a speaker comprised by a computing device based upon the second output of the decoder of the TTS model, wherein the speech expresses the emotion and the second emotional intensity level.

17. The non-transitory computer-readable storage medium of claim 16, wherein the server computing device transmits the computer-readable text to the computing system responsive to the server computing device receiving an indication that the user has accessed a website provided by the entity.

18. The non-transitory computer-readable storage medium of claim 17, wherein the website is a customer service website.

* * * * *